(12) United States Patent
Aishima et al.

(10) Patent No.: US 9,789,755 B2
(45) Date of Patent: Oct. 17, 2017

(54) ELECTRIC VEHICLE

(71) Applicant: TOYOTA JIDOSHA KABUSHIKI KAISHA, Toyota-shi, Aichi (JP)

(72) Inventors: Tetsuji Aishima, Toyota (JP); Shigeaki Murata, Nisshin (JP); Hiroyoshi Matsumoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/305,530

(22) PCT Filed: Mar. 10, 2015

(86) PCT No.: PCT/JP2015/056989
§ 371 (c)(1),
(2) Date: Oct. 20, 2016

(87) PCT Pub. No.: WO2015/163024
PCT Pub. Date: Oct. 29, 2015

(65) Prior Publication Data
US 2017/0043655 A1  Feb. 16, 2017

(30) Foreign Application Priority Data
Apr. 22, 2014 (JP) .................. 2014-088033

(51) Int. Cl.
*B60K 1/04* (2006.01)
*B60K 8/00* (2006.01)
(Continued)

(52) U.S. Cl.
CPC .................. *B60K 1/04* (2013.01); *B60K 8/00* (2013.01); *B60K 11/04* (2013.01); *B60L 11/18* (2013.01);
(Continued)

(58) Field of Classification Search
CPC . B60K 1/04; B60K 8/00; B60K 11/04; B60K 2001/0411; B60L 11/18;
(Continued)

(56) References Cited

U.S. PATENT DOCUMENTS 5,662,184 A * 9/1997 Riemer .................... B60K 1/00
180/65.1
6,819,066 B2 * 11/2004 Ishikawa ............... B60L 3/0061
318/139
(Continued)

FOREIGN PATENT DOCUMENTS

JP 2001-357863 A 12/2001
JP 2003-288908 A 10/2003
(Continued)

*Primary Examiner* — J. Allen Shriver, II
*Assistant Examiner* — Brian Cassidy
(74) *Attorney, Agent, or Firm* — Andrews Kurth Kenyon LLP

(57) ABSTRACT

A compressor, an intercooler, and a fuel cell stack are housed in a housing compartment. The compressor and the intercooler are connected with each other by upstream side piping, and the intercooler and the fuel cell stack are connected with each other by downstream side piping. The upstream side piping is formed from upstream side first and second pipe parts, and the downstream side piping is formed from downstream side first and second pipe parts. Movement of the compressor and fuel cell stack relative to the intercooler at the time of a heavy collision of the vehicle causes disconnection of the upstream side first and second pipe parts and disconnection of the downstream side first and second pipe parts, to thereby cause communication of the upstream side piping and the downstream side piping with an internal space of the housing compartment.

4 Claims, 2 Drawing Sheets

(51) Int. Cl.
B60K 11/04 (2006.01)
B60L 11/18 (2006.01)
H01M 8/2475 (2016.01)
H01M 8/04007 (2016.01)
H01M 8/04089 (2016.01)
H01M 8/04082 (2016.01)
H01M 8/04746 (2016.01)
H01M 8/04955 (2016.01)

(52) U.S. Cl.
CPC ..... B60L 11/1883 (2013.01); H01M 8/04067 (2013.01); H01M 8/04089 (2013.01); H01M 8/04201 (2013.01); H01M 8/04753 (2013.01); H01M 8/04955 (2013.01); H01M 8/2475 (2013.01); B60K 2001/0411 (2013.01); B60Y 2306/01 (2013.01); H01M 2250/20 (2013.01)

(58) Field of Classification Search
CPC ........... B60L 11/1883; H01M 8/04067; H01M 8/04089; H01M 8/04201; H01M 8/04753; H01M 8/04955; H01M 8/2475; H01M 2250/20; B60Y 2306/01
See application file for complete search history.

(56) References Cited

U.S. PATENT DOCUMENTS

| | | | | |
|---|---|---|---|---|
| 6,968,915 B2* | 11/2005 | Takagi | ............... | H01M 8/04007 180/65.245 |
| 7,478,698 B2* | 1/2009 | Shimizu | ............ | H01M 8/04089 180/220 |
| 7,506,708 B2* | 3/2009 | Iwashita | ............... | B60L 3/0084 180/220 |
| 7,798,269 B2* | 9/2010 | Makuta | ............... | H01M 8/2475 180/220 |
| 8,302,712 B2* | 11/2012 | Aoto | ........................ | B60K 1/04 180/65.1 |
| 8,546,034 B2* | 10/2013 | Katano | ............. | H01M 8/04089 264/299 |
| 8,824,876 B2* | 9/2014 | Ohtsuka | .................... | B60K 1/04 180/68.1 |
| 8,932,769 B2* | 1/2015 | Ohashi | .................... | B62D 25/20 180/65.31 |
| 9,079,508 B2* | 7/2015 | Naito | ....................... | B60K 1/04 |
| 9,162,559 B2* | 10/2015 | Arisawa | .................... | B60K 1/04 |
| 9,371,009 B2* | 6/2016 | Ishikawa | ............... | B62D 21/15 |
| 2001/0050189 A1 | 12/2001 | Shimizu | | |
| 2003/0186092 A1 | 10/2003 | Takagi et al. | | |
| 2004/0090085 A1* | 5/2004 | Kawasaki | ................ | B60K 1/04 296/187.09 |
| 2004/0108151 A1* | 6/2004 | Guidry | ..................... | B60K 1/00 429/413 |
| 2012/0080251 A1* | 4/2012 | Ohashi | ..................... | B60K 1/04 180/65.31 |
| 2014/0174708 A1 | 6/2014 | Akiyama et al. | | |
| 2014/0335434 A1* | 11/2014 | Ikeya | ..................... | B60L 1/003 429/435 |

FOREIGN PATENT DOCUMENTS

JP 2009-238440 A 10/2009
WO 2013/024535 A1 2/2013

\* cited by examiner

ELECTRIC VEHICLE

CROSS-REFERENCE TO RELATED APPLICATIONS

This is a national phase application based on the PCT International Patent Application No. PCT/JP2015/056989 filed Mar. 10, 2015, claiming priority to Japanese Patent Application No. 2014-088033 filed Apr. 22, 2014, the entire contents of both of which are incorporated herein by reference.

TECHNICAL FIELD

The present invention relates to an electric vehicle.

BACKGROUND ART

An electric vehicle is known in the art which is provided with a fuel cell stack which generates electric power by an electrochemical reaction of hydrogen and oxygen, a hydrogen shutoff valve which is arranged in a hydrogen feed path which connects the fuel cell stack and a hydrogen tank with each other, and a compressor which feeds air to the fuel cell stack, wherein at the time of a collision of the vehicle, the hydrogen shutoff valve is first closed, and the compressor is then stopped (see PTL 1). That is, in PTL 1, the compressor is continuously operated for a little while after the collision of the vehicle, to thereby consume the hydrogen remaining in the fuel cell stack.

On the other hand, an electric vehicle is also known in the art, in which a compressor, an intercooler which cools oxidizing gas discharged from the compressor, and a fuel cell stack are housed in a housing compartment which is formed outside of a passenger compartment in a vehicle length direction, in which an outlet of the compressor and an inlet of the intercooler are connected with each other by upstream side piping, and in which an outlet of the intercooler and an inlet of an oxidizing gas passage of the fuel cell stack are connected with each other by downstream side piping.

CITATIONS LIST

Patent Literature

PTL 1. Japanese Patent Publication No. 2001-357863A.

SUMMARY OF INVENTION

Technical Problem

In the above-mentioned PTL 1, the residual hydrogen is consumed after a collision of the vehicle. This means that the generation of electric power continues at the fuel cell stack even after collision of the vehicle. As a result, the fuel cell stack may be maintained at a high voltage. If the fuel cell stack is high in voltage, an operator may receive an electric shock.

Solution to Problem

According to the present invention, there is provided an electric vehicle, wherein a compressor which discharges an oxidizing gas, an intercooler which cools oxidizing gas discharged from the compressor, and a fuel cell stack which generates electric power by an electrochemical reaction of fuel gas and oxidizing gas are housed in a housing compartment which is formed outside of a passenger compartment in a vehicle length direction, wherein an outlet of the compressor and an inlet of the intercooler are connected with each other by upstream side piping, and an outlet of the intercooler and an inlet of an oxidizing gas passage of the fuel cell stack are connected with each other by downstream side piping, wherein the compressor, intercooler, and fuel cell stack are provided in the housing compartment so that one or both of the compressor and fuel cell stack will move relative to the intercooler at the time of a heavy collision of the vehicle where a load of a collision which is applied to the vehicle is larger than a predetermined upper limit value, and wherein the upstream side piping or the downstream side piping is formed so that movement of one or both of the compressor and fuel cell stack relative to the intercooler at the time of a heavy collision of the vehicle causes communication of one or both of the upstream side piping and the downstream side piping with an internal space of the housing compartment.

Advantageous Effects of Invention

It is possible to stop generation of electric power at the fuel cell stack quickly and reliably at the time of a heavy collision of the vehicle.

DESCRIPTION OF EMBODIMENTS

Figure 1:
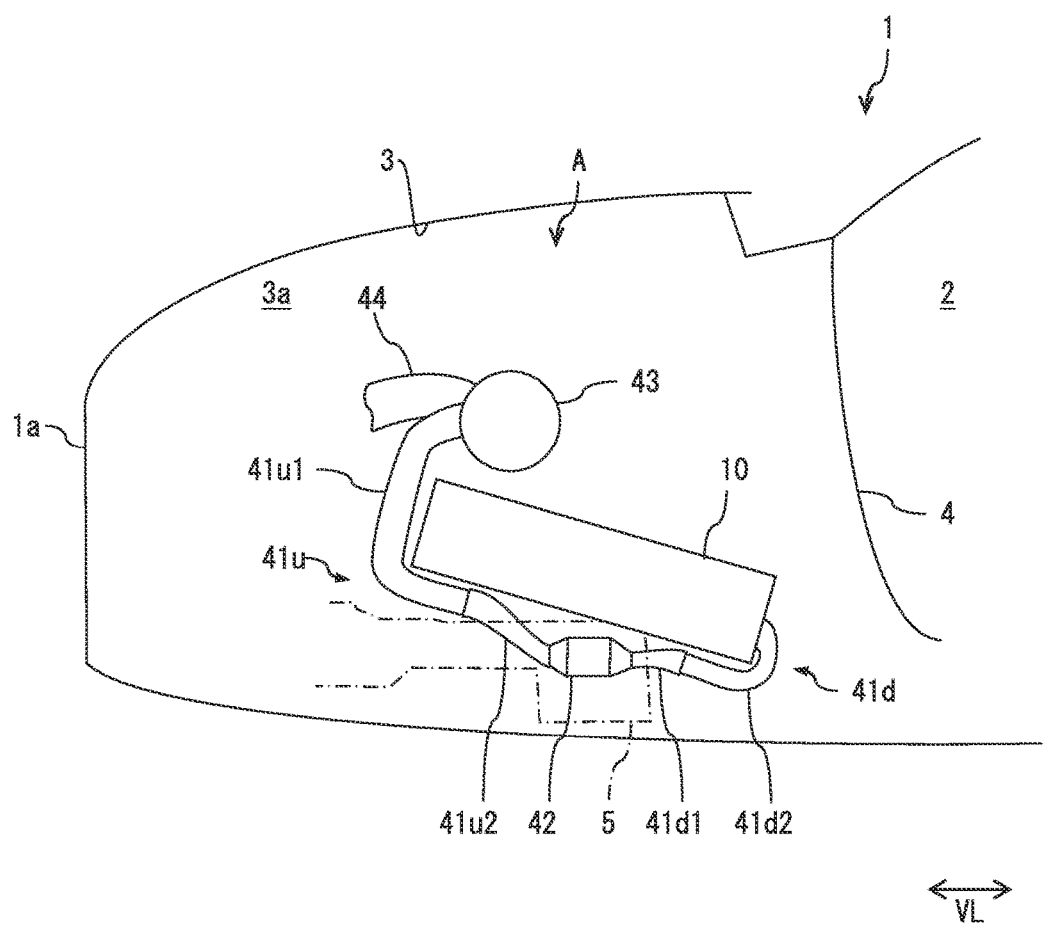
FIG. 1 is a partial side cross-sectional view of an electric vehicle.

Referring to FIG. 1, an electric vehicle 1 is provided with a passenger compartment 2 and a housing compartment 3 which is formed outside or at a front side of the passenger compartment 2 in a vehicle length direction. In the embodiment which is shown in FIG. 1, the housing compartment 3 is separated from the passenger compartment 2 by a dashboard 4. Inside this housing compartment 3, part or all of a fuel cell system A is held.

Figure 2:
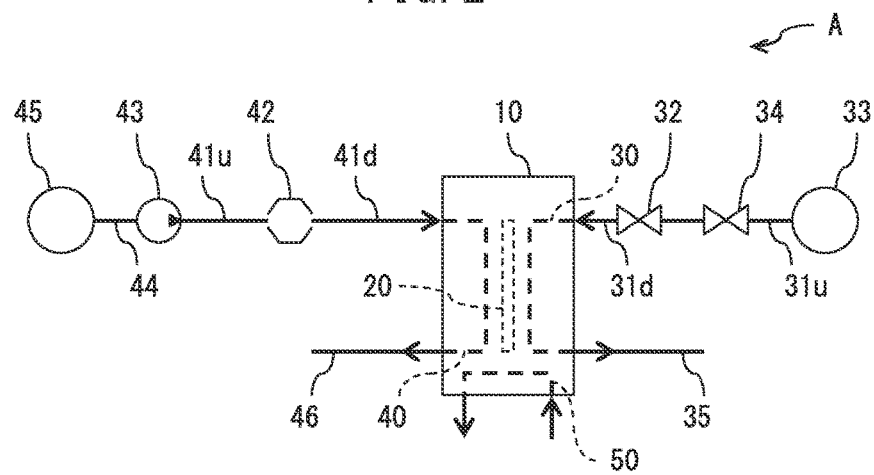
FIG. 2 is an overview of a fuel cell system.

FIG. 2 shows one example of the fuel cell system A. Referring to FIG. 2, the fuel cell system A is provided with a fuel cell stack 10. The fuel cell stack 10 is provided with a plurality of fuel cell units which are stacked with each other in the stacking direction. Each fuel cell unit includes a membrane electrode assembly 20. The membrane electrode assembly 20 is comprised of a membrane-shaped electrolyte, an anode which is formed at one side of the electrolyte, and a cathode which is formed at the other side of the electrolyte. Further, inside each fuel cell unit, a fuel gas flow passage for feeding fuel gas to the anode, an oxidizing gas flow passage which feeds oxidizing gas to the cathode, and a cooling water flow passage for feeding cooling water to the fuel cell unit are respectively formed. By connecting the fuel gas flow passages, oxidizing gas flow passages, and cooling water flow passages of the plurality of fuel cell units respectively in series, the fuel cell stack 10 is formed with a fuel gas passage 30, oxidizing gas passage 40, and cooling water passage 50.

A downstream side fuel gas piping 31d is connected with an inlet of the fuel gas passage 30. The downstream side fuel gas feed pipe 31d is connected with an outlet of a regulator 32 which regulates a pressure of the fuel gas. An upstream side fuel gas piping 31u is connected with an inlet of the regulator 32a. The upstream side fuel gas piping 31u is connected with a fuel gas source 33. In the embodiment according to the present invention, the fuel gas is formed from hydrogen, while the fuel gas source 33 is formed from a hydrogen tank. A fuel gas shutoff valve 34 is arranged in the upstream side fuel gas piping 31u. On the other hand, an anode off-gas pipe 35 is connected with an outlet of the fuel gas passage 30. If the fuel gas shutoff valve 34 is opened, the fuel gas in the fuel gas source 33 is fed to the inside of the fuel gas passage 30 in the fuel cell stack 10. At this time, a gas which flows out from the fuel gas passage 30, that is, an anode off-gas, flows inside of the anode off-gas pipe 35.

Further, a downstream side oxidizing gas piping 41d is connected with an inlet of the oxidizing gas passage 40. The downstream side oxidizing gas piping 41d is connected with an outlet of an intercooler 42 which cools the oxidizing gas. An upstream side oxidizing gas piping 41u is connected with an inlet of the intercooler 42. The upstream side oxidizing gas piping 41u is connected with an outlet of a compressor 43 which discharges the oxidizing gas. An oxidizing gas duct 44 is connected with an inlet of the compressor 43. The oxidizing gas duct 44 is connected with an oxidizing gas source 45. In the embodiment according to the present invention, the oxidizing gas is formed from air, and the oxidizing gas source 45 is formed from the atmosphere. On the other hand, a cathode off-gas pipe 46 is connected with an outlet of the oxidizing gas passage 40. If the compressor 43 is driven, the oxidizing gas inside of the oxidizing gas source 45 is fed to the inside of the oxidizing gas passage 40 in the fuel cell stack 10. A gas which flows out from the oxidizing gas passage 40 at this time, that is, a cathode off-gas, flows into the inside of the cathode off-gas pipe 46.

If fuel gas and oxidizing gas are fed to the fuel cell stack 10, an electrochemical reaction $(O_2+4H^++4e^-\rightarrow 2H_2O)$ occurs and electrical energy is generated in the fuel cell units. This generated electrical energy is sent to a motor-generator (not shown). As a result, the motor-generator is operated as an electric motor for driving a vehicle and the vehicle is driven.

Referring again to FIG. 1, FIG. 1 shows the compressor 43, intercooler 42, fuel cell stack 10, upstream side oxidizing gas piping 41u, downstream side oxidizing gas piping 41d, and oxidizing gas duct 44, of the fuel cell system A. Below, the upstream side oxidizing gas piping 41u and the downstream side oxidizing gas piping 41d will be respectively referred to as an "upstream side piping 41u" and a "downstream side piping 41d".

In the embodiment which is shown in FIG. 1, the upstream side piping 41u is formed from a mutually connected upstream side first pipe part 41u1 and upstream side second pipe part 41u2. That is, an outlet of the compressor 43 is connected with the upstream side first pipe part 41u1, the upstream side first pipe part 41u1 is connected with the upstream side second pipe part 41u2, and the upstream side second pipe part 41u2 is connected with the inlet of the intercooler 42. Similarly, the downstream side piping 41d is formed from a mutually connected downstream side first pipe part 41d1 and downstream side second pipe part 41d2. That is, an outlet of the intercooler 42 is connected with the downstream side first pipe part 41d1, the downstream side first pipe part 41d1 is connected with the downstream side second pipe part 41d2, and the downstream side second pipe part 41d2 is connected with the inlet of the oxidizing gas passage of the fuel cell stack 10. In another embodiment (not shown), the upstream side piping 41u or the downstream side piping 41d are formed from a single pipe part. In still another embodiment (not shown), the upstream side piping 41u or the downstream side piping 41d is formed from three or more pipe parts.

The connections between the compressor 43, intercooler 42, and fuel cell stack 10 and the upstream side piping 41u and the downstream side piping 41d and the connections between the pipe parts 41u1, 41u2, 41d1, and 41d2 are achieved by, for example, forming overlap parts where one is inserted into the other and tightening clips provided around these overlap parts.

Further, in the embodiment which is shown in FIG. 1, parts of the upstream side piping 41u and the downstream side piping 41d, for example the upstream side first pipe part 41u1 and the downstream side second pipe part 41d2, are formed from a material with a relatively high rigidity, for example, a metal. On the other hand, the remainders of the upstream side piping 41u and the downstream side piping 41d, for example, the upstream side second pipe part 41u2 and the downstream side first pipe part 41d1, are formed from a material with a relatively high flexibility, for example, a plastic. Note that, in the embodiment which is shown in FIG. 1, the upstream side first pipe part 41u1 and the downstream side second pipe part 41d2 are fastened to the fuel cell stack 10. On the other hand, the upstream side second pipe part 41u2 and the downstream side first pipe part 41d1 are not fastened to the fuel cell stack 10.

Furthermore, in the embodiment which is shown in FIG. 1, the intercooler 42 is directly fastened to a frame of the electric vehicle 1, for example, a suspension member 5. As opposed to this, the compressor 43 and fuel cell stack 10 are indirectly fastened through mounts (not shown) to the suspension member 5. Specifically, the fuel cell stack 10 is fastened through mounts to the suspension member 5, while the compressor 43 is fastened through mounts to the fuel cell stack 10. In another embodiment (not shown), the compressor 43 is fastened to the suspension member 5 through mounts. In still another embodiment (not shown), the fuel cell stack 10 or the compressor 43 is fastened through mounts to another element of the fuel cell system A, for example, the motor-generator.

If, in this way, providing the compressor 43, fuel cell stack 10, and intercooler 42 inside the housing compartment 3, one or both of the compressor 43 and fuel cell stack 10 can move relative to the intercooler 42 at the time of collision of the vehicle. That is, if the vehicle 1 collides at a front end 1a thereof, an inward load in the vehicle length direction VL, that is, a backward collision load, acts on the vehicle 1. If this backward collision load is larger than a predetermined upper limit value, that is, if heavy collision of the vehicle occurs, one or both of the compressor 43 and fuel cell stack 10, which are relatively heavy in weight, separate from the mounts and move from their initial positions. As opposed to this, the intercooler 42, which is relatively light in weight, is directly fastened to the suspension member 5 and does not move. As a result, at the time of heavy collision of the vehicle, one or both of the compressor 43 and fuel cell stack 10 move relative to the intercooler 42.

Figure 3:
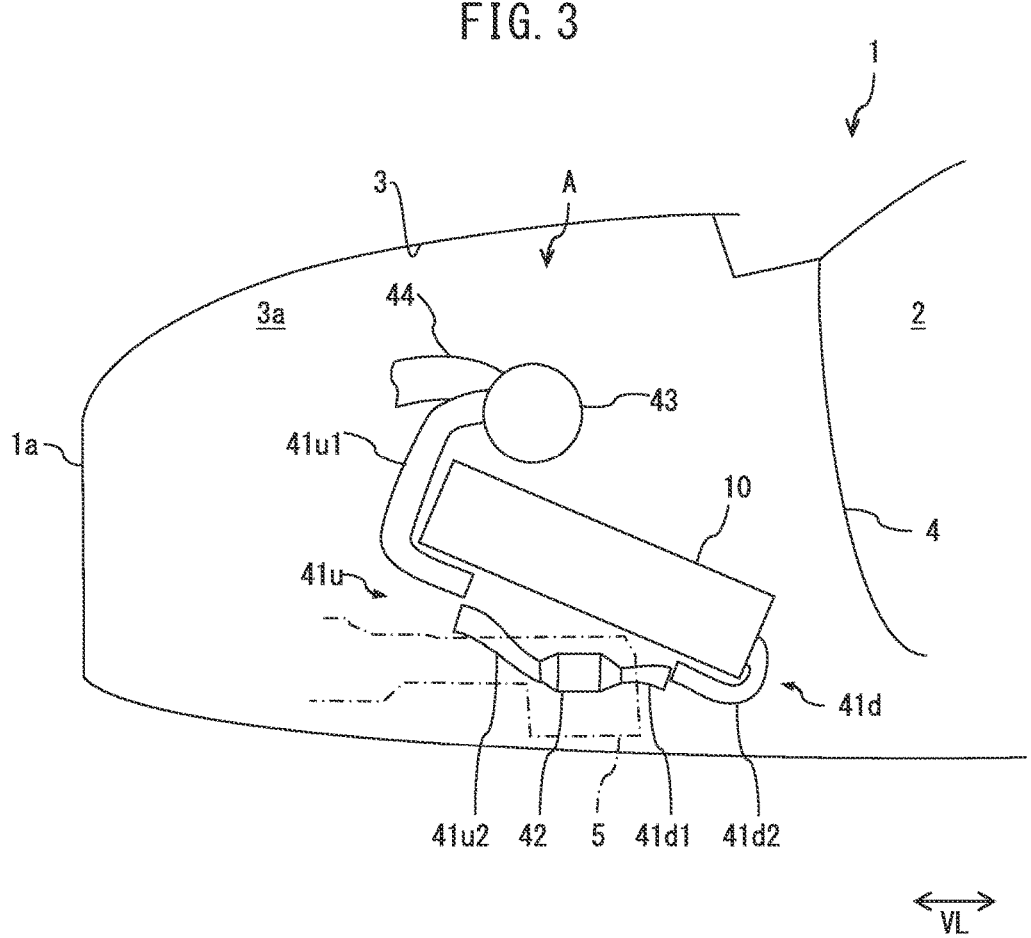
FIG. 3 is a partial side cross-sectional view of an electric vehicle at the time of a heavy collision of the vehicle.

FIG. 3 shows a case where the compressor 43 and fuel cell stack 10 move relative to the intercooler 42 due to a heavy collision of the vehicle. In the embodiment which is shown in FIG. 3, the compressor 43 and fuel cell stack 10 move in a direction where a front end of the fuel cell stack 10 is lifted up with respect to a rear end of the fuel cell stack 10. As a result, the upstream side first pipe part 41u1 and the upstream side second pipe part 41u2 are disconnected from each other. Further, the downstream side first pipe part 41d1 and the downstream side second pipe part 41d2 are disconnected from each other. Therefore, the upstream side piping 41u and the downstream side piping 41d communicate with the internal space 3a of the housing compartment 3. In another embodiment (not shown), only one of disconnection between the upstream side first pipe part 41u1 and the upstream side second pipe part 41u2 and disconnection between the downstream side first pipe part 41d1 and the downstream side second pipe part 41d2 occur.

In this regard, in the embodiment according to the present invention, the electric vehicle 1 is provided with an acceleration sensor (not shown) which detects an acceleration of the vehicle 1. If the acceleration which is detected by the acceleration sensor exceeds a predetermined threshold value, it is judged that a heavy collision of the vehicle has occurred, while if the acceleration does not exceed the threshold value, it is judged that a heavy collision of the vehicle has not occurred. If it is judged that a heavy collision of the vehicle has occurred, the feed of electric power to the compressor 43 is stopped to make the compressor 43 stop and the feed of oxidizing gas to the fuel cell stack 10 is stopped. Further, at this time, the fuel gas shutoff valve 34 (FIG. 2) is closed and the feed of fuel gas to the fuel cell stack 10 is stopped. As a result, a generation of electric power at the fuel cell stack 10 is stopped. Furthermore, the fuel cell stack 10 is provided with an electric discharge device (not shown). If it is judged that a heavy collision of the vehicle has occurred, the electric discharge device is actuated so that the fuel cell stack 10 is discharged. As a result, a voltage of the fuel cell stack 10 is made to fall and an operator can safely perform work. Note that, in the embodiment according to the present invention, an air bag which is provided in the passenger compartment 2 is deployed if it is judged that a heavy collision of the vehicle has occurred, while it is not deployed if it is judged that a heavy collision of the vehicle has not occurred.

In this regard, even if the feed of electric power to the compressor 43 is stopped, movable parts of the compressor 43 such as a rotor will continue to move due to inertia, so the feed of oxidizing gas from the compressor 43 is not immediately stopped, that is, oxidizing gas continues to be discharged from the compressor 43. On the other hand, fuel gas remains inside the fuel cell stack 10. For this reason, if the oxidizing gas which is discharged from the compressor 43 continues to be fed to the fuel cell stack 10, electric power will continue to be generated at the fuel cell stack 10. As a result, the fuel cell stack 10 will end up being maintained at a high voltage.

In the embodiment according to the present invention, if a heavy collision of the vehicle occurs, the upstream side piping 41u and the downstream side piping 41d communicate with the internal space 3a of the housing compartment 3, as explained above. As a result, even if oxidizing gas continues to be discharged from the compressor 43, the oxidizing gas is released into the internal space 3a of the housing compartment 3, that is, is no longer fed to the fuel cell stack 10. That is, the feed of oxidizing gas to the fuel cell stack 10 is quickly stopped at the time of a heavy collision of the vehicle. Further, a pressure in the oxidizing gas passage 40 of the fuel cell stack 10 (FIG. 2) is higher than a pressure in the internal space 3a of the housing compartment 3, so the remaining oxidizing gas flows out from the oxidizing gas passage 40 to the internal space 3a. As a result, the generation of electric power at the fuel cell stack 10 is quickly stopped.

Note that, when the upstream side piping 41u and the downstream side piping 41d communicate with the internal space 3a of the housing compartment 3, the oxidizing gas passage 40 of the fuel cell stack 10 also communicates with the inside of the internal space 3a. In this case, the air or oxidizing gas inside the internal space 3a may flow into the inside of the fuel cell stack 10 due to, for example, convection. As a result, generation of electric power may continue or resume at the fuel cell stack 10. However, an amount of oxidizing gas which flows from the internal space 3a to the inside of the fuel cell stack 10 is small. Therefore, even if electric power is generated at the fuel cell stack 10, the above-mentioned electric discharge device maintains the fuel cell stack 10 at a low voltage.

On the other hand, if a heavy collision of the vehicle has not occurred, the connection between the upstream side first pipe part 41u1 and the upstream side second pipe part 41u2 and the connection between the downstream side first pipe part 41d1 and the downstream side second pipe part 41d2 are maintained. That is, the upstream side piping 41u and the downstream side piping 41d continue to be separated from the internal space 3a of the housing compartment 3.

Therefore, according to a different point of view, in the embodiment which is shown in FIG. 3, a connecting force between the upstream side first pipe part 41u1 and the upstream side second pipe part 41u2 and a connecting force between the downstream side first pipe part 41d1 and the downstream side second pipe part 41d2 are set so that movement of one or both of the compressor 43 and fuel cell stack 10 relative to the intercooler 42 causes communication of one or both of the upstream side piping 41u and the downstream side piping 41d with the internal space 3a of the housing compartment 3 at the time of a heavy collision of the vehicle, while both of the upstream side piping 41u and the downstream side piping 41d continue to be separated from the internal space 3a at times other than a heavy collision of the vehicle.

In this regard, if adding an oxidizing gas shutoff valve between the compressor 43 and the fuel cell stack 10 such as inside the downstream side piping 41d and closing this oxidizing gas shutoff valve at the time of a heavy collision of the vehicle, it is possible to quickly stop the feed of oxidizing gas to the fuel cell stack 10. Alternatively, if adding a braking device which stops movements of movable parts of the compressor 43 and making movements of the movable parts stop at the time of a heavy collision of the vehicle, it is possible to quickly stop the feed of the oxidizing gas. However, these cases require additional costs. As opposed to this, in the embodiment according to the present invention, the feed of oxidizing gas to the fuel cell stack 10 can be quickly stopped without any additional costs.

In another embodiment (not shown) according to the present invention, movement of one or both of the compressor 43 and fuel cell stack 10 relative to the intercooler 42 at the time of a heavy collision of the vehicle causes at least one of disconnection between the compressor 43 and the upstream side piping 41u, disconnection between the upstream side piping 41u and the intercooler 42, disconnection between the intercooler 42 and the downstream side piping 41d, and disconnection between the downstream side piping 41d and the fuel cell stack 10. In this case, according to a different or of view, connecting forces between the compressor 43, fuel cell stack 10, and intercooler 42 and the upstream side piping 41u and the downstream side piping 41d are set so that movement of one or both of the compressor 43 and fuel cell stack 10 relative to the intercooler 42 at the time of a heavy collision of the vehicle causes communication of one or both of the upstream side piping 41u and the downstream side piping 41d with the internal space 3a of the housing compartment 3, while both of the upstream side piping 41u and the downstream side piping 41d continue to be separated from the internal space 3a at times other than a heavy collision of the vehicle.

In still another embodiment (not shown) according to the present invention, movement of one or both of the compressor 43 and fuel cell stack 10 relative to the intercooler 42 at the time of a heavy collision of the vehicle causes fracture of a pipe wall of the upstream side piping 41u or the downstream side piping 41d and thereby the upstream side piping 41u or the downstream side piping 41d communicates with the internal space 3a of the housing compartment 3. Note that the "fracture" in this case differs in nature from a fracture of the upstream side piping 41u or the downstream side piping 41d caused by a collision of, for example, the motor-generator to the upstream side piping 41u or the downstream side piping 41d at the time of a heavy collision of the vehicle. In this case, strengths of the upstream side piping 41u and the downstream side piping 41d are set so that movement of one or both of the compressor 43 and fuel cell stack 10 relative to the intercooler 42 at the time of a heavy collision of the vehicle causes communication of one or both of the upstream side piping 41u and the downstream side piping 41d with the internal space 3a of the housing compartment 3, while both the upstream side piping 41u and the downstream side piping 41d continue to be separated from the internal space 3a at times other than a heavy collision of the vehicle. Note that it is possible to understand the disconnection between the upstream side first pipe part 41u1 and the upstream side second pipe part 41u2 and the disconnection between the downstream side first pipe part 41d1 and the downstream side second pipe part 41d2 such as explained with reference to FIG. 3 as fracture of the upstream side piping 41u and fracture of the downstream side piping 41d, respectively.

In any case, in a generalized expression, the upstream side piping 41u or the downstream side piping 41d is formed so that movement of one or both of the compressor 43 and fuel cell stack 10 relative to the intercooler 42 at the time of a heavy collision of the vehicle causes communication of one or both of the upstream side piping 41u and the downstream side piping 41d with the internal space 3a of the housing compartment 3, while both of the upstream side piping 41u and the downstream side piping 41d continue to be separated from the internal space 3a at times other than a heavy collision of the vehicle.

In another embodiment (not shown), a humidifier, intake valve, etc. are arranged between the compressor 43 and the fuel cell stack 10.

REFERENCE SIGNS LIST 1. electric vehicle
2. passenger compartment
3. housing compartment
5. suspension member
10. fuel cell stack
41u. upstream side piping
41d. downstream side piping
42. intercooler
43. compressor
A. fuel cell system

The invention claimed is:

1. An electric vehicle,
   wherein a compressor which discharges an oxidizing gas, an intercooler which cools oxidizing gas discharged from the compressor, and a fuel cell stack which generates electric power by an electrochemical reaction of fuel gas and oxidizing gas are housed in a housing compartment which is formed outside of a passenger compartment in a vehicle length direction,
   wherein an outlet of the compressor and an inlet of the intercooler are connected with each other by upstream side piping, and an outlet of the intercooler and an inlet of an oxidizing gas passage of the fuel cell stack are connected with each other by downstream side piping,
   wherein the compressor, intercooler, and fuel cell stack are provided in the housing compartment so that one or both of the compressor and fuel cell stack will move relative to the intercooler at the time of a heavy collision of the vehicle where a load of a collision which is applied to the vehicle is larger than a predetermined upper limit value, and
   wherein the upstream side piping or the downstream side piping is formed so that movement of one or both of the compressor and fuel cell stack relative to the intercooler at the time of a heavy collision of the vehicle causes communication of one or both of the upstream side piping and the downstream side piping with an internal space of the housing compartment.

2. The electric vehicle according to claim 1, wherein the intercooler is directly fastened to a vehicle frame while the compressor and the fuel cell stack are indirectly fastened to the vehicle frame through mounts.

3. The electric vehicle according to claim 1, wherein the upstream side piping or the downstream side piping is formed from a plurality of pipe parts which are connected with each other, and wherein movement of one or both of the compressor and fuel cell stack relative to the intercooler at the time of a heavy collision of the vehicle causes disconnection of the pipe parts, to thereby cause communication of one or both of the upstream side piping and the downstream side piping with the internal space of the housing compartment.

4. The electric vehicle according to claim 2, wherein the upstream side piping or the downstream side piping is formed from a plurality of pipe parts which are connected with each other, and wherein movement of one or both of the compressor and fuel cell stack relative to the intercooler at the time of a heavy collision of the vehicle causes disconnection of the pipe parts, to thereby cause communication of one or both of the upstream side piping and the downstream side piping with the internal space of the housing compartment.

* * * * *